Figure 3:
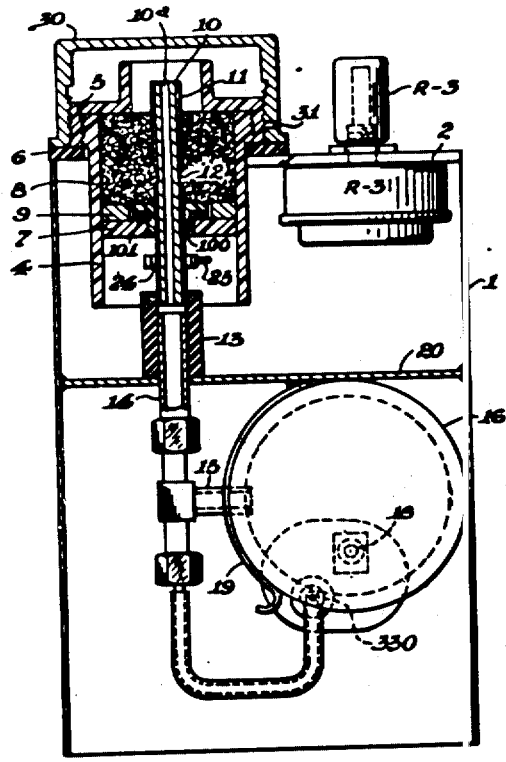

Feb. 6, 1951 M. G. JACOBSON 2,540,674
APPARATUS FOR DETERMINING OXYGEN IN GASES
Original Filed May 22, 1943 2 Sheets-Sheet 1
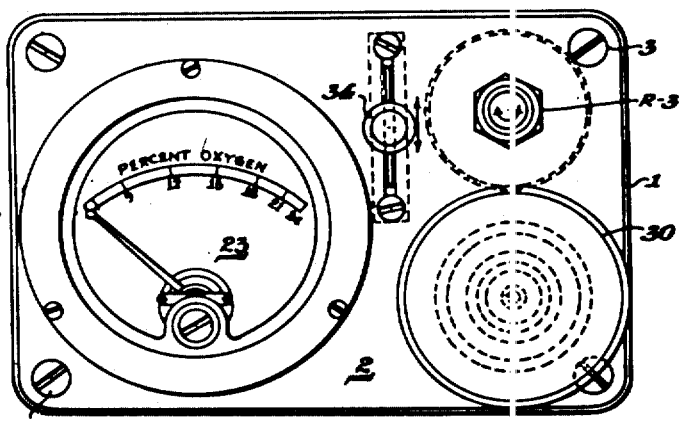
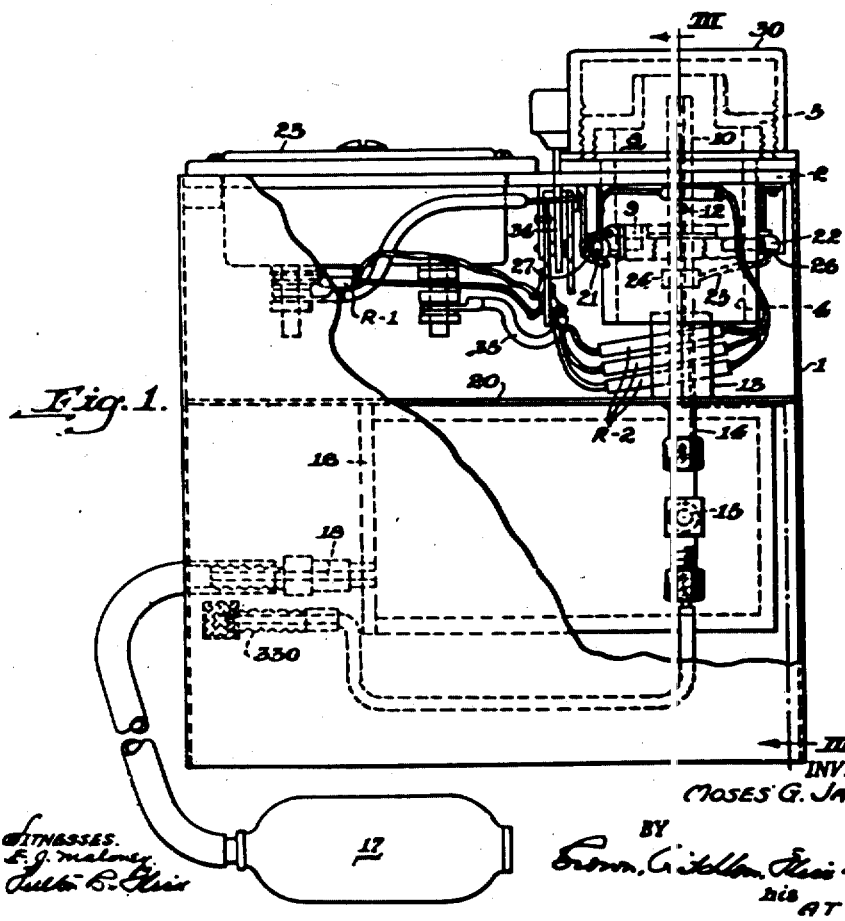
INVENTOR.
MOSES G. JACOBSON.

INVENTOR.
MOSES G. JACOBSON

Patented Feb. 6, 1951

2,540,674

UNITED STATES PATENT OFFICE 2,540,674

APPARATUS FOR DETERMINING OXYGEN IN GASES

Moses G. Jacobson, Verona, Pa., assignor to Mine Safety Appliances Company, Pittsburgh, Pa., a corporation of Pennsylvania Original application May 22, 1943, Serial No. 488,046. Divided and this application June 27, 1946, Serial No. 679,729

2 Claims. (Cl. 175—183)

1

This invention relates to apparatus for the determination of the concentration of oxygen in air and other gases.

Although the invention is applicable to the determination of oxygen concentrations at least as high as 99 per cent, it is particularly useful for determining the deficiency of oxygen in air atmospheres, for which reason it will be described with particular reference thereto.

There has existed a need for a portable oxygen deficiency meter which is easily used, does not create an explosion or fire hazard in use, and is sufficiently accurate for all practical purposes. Thus, such oxygen deficiency detectors are useful in connection with mine and manhole atmospheres, in high altitude flying, for use in submarines, and for related purposes. At present, mine and manhole atmospheres are commonly tested for oxygen deficiency by means of the well-known flame safety lamp, which is useful to give a qualitative indication of oxygen deficiency down to 16 per cent of oxygen; below that concentration the flame is extinguished. Moreover, flame lamps are not proof against accident in, for example, manholes into which city gas containing hydrogen may escape. For such purposes it would be desirable to have means available for determining the oxygen concentration or deficiency accurately, rapidly, and with safety.

Primary cells of the Fery type, comprising a zinc anode, a porous carbon cathode, and a solution of ammonium chloride as the electrolyte, depend for depolarization upon atmospheric oxygen which diffuses through the cathode and acts at the electrode-electrolyte interface to oxidize the hydrogen ions liberated at the cathode. The extent of depolarization is a function of the oxygen reaching the interface, and it has therefore been proposed to use such a galvanic cell for determining oxygen concentration of gases. Particularly, such a system would be desirable for use under widely varying conditions of barometric pressure because the oxygen sensitivity of such a cell is directly proportional to the barometric pressure. Thus, a 10.5 per cent concentration of oxygen at 760 mm. pressure will cause the same meter deflection as a 21 per cent concentration at 380 mm. This is desirable for making measurements at high altitudes or under subsurface conditions because for such purposes the important thing is the partial pressure of oxygen rather than its volume concentration.

However, the prior proposals do not afford a satisfactory instrument for determining oxygen concentration, and they have not resulted in any-

2 thing of practical significance. For instance, according to one proposal three electrical measurements are necessary for making each determination, there is a lag in attaining the indication, and frequent recalibration is necessary. This, coupled with the fact that the meter does not give a zero indication at zero per cent of oxygen, which complicates and slows the determinations, and the fact that the range of accurate determination extends only from zero to about 2 per cent of oxygen, renders that proposal highly impractical. Furthermore, a liquid solution of ammonium chloride electrolyte is used, and this is undesirable in a portable apparatus, particularly under flying or other conditions where it may not be practicable to keep the apparatus upright at all times. Again it has been found that in applying the prior suggestions temperature has a large influence upon the meter readings, and it is necessary to maintain certain critical relations in the electrical circuit. Experience has shown also that difficulties are encountered with the cathode because different carbons, even from the same lot, exhibit different degrees of sensitivity which necessitates recalibration of the instrument each time the cathode is replaced. Owing to these and other troubles and disadvantages, the previous proposals were not practicable and were never used.

It is among the objects of this invention to provide an apparatus for determining oxygen concentration in gaseous atmospheres, which makes use of the principles of the Fery cell while avoiding the disadvantages heretofore encountered in attempting to use it for this purpose, and which is simple, of practicable sensitivity and accuracy, is easily used, and is applicable to portable and rugged apparatus adapted for high altitude and subsurface work.

Other objects will appear from the following description.

Figure 4:
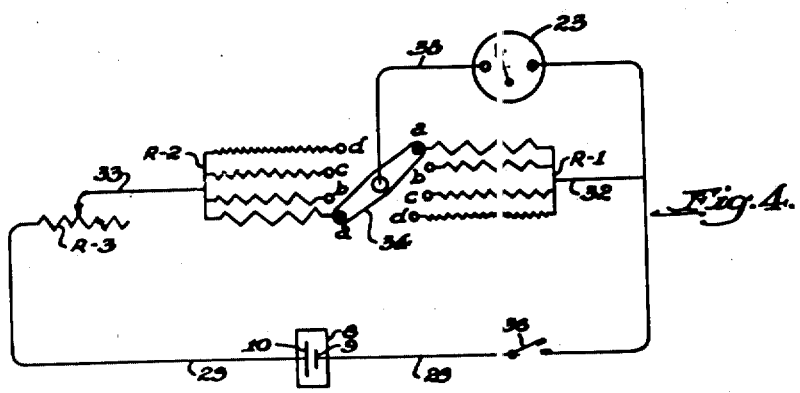

The invention will be described with reference to the accompanying drawings in which Fig. 1 is a side elevation of the preferred embodiment, parts being broken away for clarity of illustration; Fig. 2 a plan view of the instrument shown in Fig. 1; Fig. 3 a vertical sectional view taken on line III—III, Fig. 1; and Fig. 4 a wiring diagram illustrative of one feature of the invention and embodied in the instrument shown in Fig. 1.

In accordance with this invention the objects are attained by maintaining the current density at the cathode, or positive terminal, of the detector cell constant. In that manner the rate of hydrogen ion liberation per unit of area of the cathode is constant and the depolarization E. M. F. produced by a given partial pressure of oxygen in the atmosphere being tested is likewise constant. By the application of my concept, therefore, it becomes possible to provide an instrument which after being calibrated is of adequate sensitivity for practical purposes and applicable to direct determination of oxygen concentrations, and the determinations depend neither upon the condition of the electrolyte or the anode, nor upon the temperature or total pressure as long as they are substantially uniform throughout the cell.

I apply this concept practically by restricting the area over which the gas comes into contact with the cathode-electrolyte interface. In other words, the cathode is so constructed or arranged in the cell that the test gas exerts its depolarizing effect over a predetermined area of restricted size, and can not come into contact with any other portion of the cathode-electrolyte interface.

I have found further that the higher the cathode current density is at the start of the test, or when the instrument is used with pure air, the closer the calibration curve is to a straight line. Since the maximum E. M. F. available is of the order of 1.5 volts, the most practical way of increasing the current density is to restrict the active depolarizing surface to a very small area, and if the area over which the test gas has access to the cathode-electrolyte surface is sufficiently small, a close approach to a straight line calibration curve can be obtained.

The depolarizing electrode (cathode when considered interiorly, positive terminal exteriorly, of the cell) used in the practice of this invention is permeable by gases but is substantially impermeable by the electrolyte with which it is used. For most purposes I prefer to use porous carbon for this purpose because of its negligible potential with respect to all electrolytes. However, electrodes possessing the properties necessary for the purposes of the invention may be made from other materials, including metals and alloys.

The anode, or negative terminal, is a metal which is above the material of the cathode in the electrochemical series i. e., which for brevity may be said to be electropositive to the cathode. Zinc may be used as the anode, but cadmium or other metals electropositive to the cathode can be used if desired for purposes of increasing the life of the cell or for other reasons.

Although various electrolytes might be used, it is at present preferred to use ammonium chloride, and contrary to the customary practice in primary cell construction, I prefer to use electrolytes of relatively dilute strength. Thereby the life of the cell is increased by reason of less intense action at the anode, and difficulties due to crystallization from the electrolyte are reduced. The exact concentration will depend, of course, upon the particular salt used and such other factors as the sensitivity of the electric meter, but generally speaking I prefer that the electrolyte shall contain not over about 5 per cent of solute.

It is important that the electrolyte of a portable instrument be non-spillable. I have found that this is accomplished satisfactorily by soaking up the electrolyte in an absorbent material such as pumice or sponge, most suitably a fibrous absorbent such as absorbent cotton. For most purposes I prefer to add to the absorbent material enough electrolyte so that it is almost but not quite saturated. This provides the electrolyte in a condition of optimum and maintained uniformity, and the operating life of the cell is longer than where a liquid electrolyte is used. Moreover, there is the added advantage that the cells may be assembled and stored in a dry condition, the electrolyte being simply poured onto the absorbent in the cell when it is to be put into use.

The apparatus provided by the invention comprises a primary cell which includes a container, or electrolyte chamber, in which there is disposed a body of absorbent material soaked with a solution of ammonium chloride or other electrolyte. Mounted within the cell are two electrodes capable of generating an E. M. F. when in contact with the electrolyte. The electronegative electrode, suitably of carbon, is so constructed and arranged as to have one surface in contact with the electrolyte and the other surface available for contact with the gas to be tested, and it presents only a restricted area in contact with the electrolyte which is acted upon by gas which diffuses through the electrode. The cathode in accordance with the invention, is so constructed that gas can diffuse to the cathode-electrolyte interface only through a restricted area of predetermined size. The electrodes are connected electrically to a suitable meter or other means for measuring current flow in the circuit thus established, together with adjustable resistance means for adjusting the current density at the cathode to a predetermined constant value.

In the use of the apparatus provided by this invention, the gas to be tested is passed in contact with one surface of the cathode of a primary cell of the type just described, in which depolarization can be effected by oxygen from a gaseous atmosphere, the other surface of the cathode being in contact with an electrolyte of the type referred to above and which when current is drawn from the cell liberates at the cathode polarizing ions, such as hydrogen ions, that are depolarized by oxygen. Initially air or other gas of known oxygen concentration is passed over the cathode and the resistance of the circuit is adjusted to bring the current density at the active surface of the cathode to a predetermined value. The standard gas is then replaced by the gas whose oxygen content is to be determined and if its oxygen concentration is different than that of the standard gas the degree of polarization will be different and will increase or decrease the flow of current depending upon whether its oxygen concentration, or partial pressure, is below or above that of the standard gas, and this result will be measured by the meter in the circuit.

The accompanying drawings represent the preferred embodiment of the invention and further details and features of the invention will be described with reference thereto.

The embodiment shown in Figs. 1 to 4 represents a portable apparatus mounted within a casing 1 provided with a removable cover plate 2 held in position by screws 3, and for ease of assembly, use and repair all of the operative elements of the device are carried by this plate.

Extending through the cover plate 2 is a tubular member 4 the upper end of which is provided with an outwardly flanged portion between which and the upper surface of the cover plate there is disposed a resilient gasket 6. For ease of filling the electrolyte chamber with absorbent material it is preferred that the flanged portion be supplied as a member 5 removably connected to tubular member 4 by screw threads, as shown particularly in Fig. 3. A base closure member 7 mounted within member 4 forms an electrolyte chamber 5. Members 4, 5 and 7 are suitably made from a transparent synthetic resin which is unaffected by the electrolyte and the operation of the cell.

In the embodiment shown the anode comprises an annulus 9 of zinc or other suitable metal mounted in fixed position against the upper surface of bottom plate 7. The cathode comprises a tube 10 of porous carbon which is cemented in the bore of a bushing 100, of suitable insulating synthetic resin or other insulating material, which is provided with screw threads cooperating with similar threads formed in a bore disposed centrally in base 7, as seen in Fig. 3, so that the head of the bushing lies in the opening of anode 7 and the cathode is disposed centrally of the cell and extends downwardly into the open space beneath base 7. A rubber gasket 101 is compressed between the bushing head and base 7, to make a liquid-tight seal.

In accordance with the invention, the area over which gas passed through the bore 10a of cathode 10 may diffuse to the electrolyte-contacting surface is of restricted area. Although this may be accomplished in various ways, in the embodiment shown the outer surface of that portion of the cathode which lies within the electrolyte chamber is provided with a coating 11 of varnish or similar coating material which acts to prevent contact of the electrolyte with the coated surface. At one or more small areas 12 the electrode surface is uncoated, and it is only at these areas that oxygen from gas passed through the bore 10a of the cathode can diffuse to the electrolyte interface. For most purposes it is preferred to machine small areas of the cathode away, as shown at 12 in Fig. 3, so that the diffusion path will be at a minimum and the determinations made with the instrument thus expedited. In this way the electrically conductive area is made small enough to give a high surface concentration of the polarizing gas or other material.

When the cover plate is set in place the lower end of cathode 10 slips into a rubber sleeve 13 mounted on a tube 14 which is connected by a side arm 15 to a scrubber 16 containing a carbon dioxide absorbing material, such as that sold under the trade mark "Cardoxide," for removing carbon dioxide from the gas being tested. An aspirator bulb 17 draws gas from the atmosphere to be tested and passes it through a conduit 18 into scrubber 16. Scrubber 16 is detachably suspended by a spring clip 19 connected to a partition member 20 disposed within casing 1.

A pair of terminals 21 and 22 are provided for connecting the electrodes to a suitable current indicating device such as a microammeter 23. Cathode 10 is connected by a spring clip 24 and lead 25 to terminal 22, and anode 9 is connected by a metallic strip to terminal 21 through the wall of container 4. Spring clips 26 and 27 receive terminals 22 and 21 respectively, and are in turn connected respectively to wires 28 and 29 which act as leads to the meter 23.

Electrolyte chamber 5 is filled, as shown in Fig. 3, with absorbent cotton or similar absorbent material which carries the electrolyte, suitably a relatively dilute solution of ammonium chloride. To minimize evaporation of water from the electrolyte and to prevent access of air directly into the cell, there is provided a cap member 30 provided with screw threads complementary to threads formed on flanged member 5. It may be screwed tightly against gasket 6 when the instrument is not in use. The cap is provided with means for permitting escape of gas from the upper end of cathode 10 when the instrument is in use and adapted to prevent entrance of air into the upper end of the cell. This may take the form of a one-way relief valve, but I have found that satisfactory results are had by providing a lateral opening 31 through the side wall of cap 30 toward its lower end so that when the cap is screwed tightly against gasket 6 access of air to the upper end of the cell is substantially precluded. However, by unscrewing the cap a few turns gas passed through the bore of cathode 10 can pass along the threads and escape through opening 31. The threads create a slight back pressure which prevents inflow of air into the cell but is not detrimental to its operation.

As indicated above, it is necessary in the use of this apparatus not only to maintain a definite area of contact between gas being tested and the cathode-electrolyte interface, but also to adjust the initial current density at the active surface of the cathode to a predetermined constant value against air or another standard gas of known oxygen concentration. To this end a simple rheostat would suffice if all other factors remained constant. I have found, however, that the diffusion area generally becomes gradually smaller with the passage of time due to partial closure of the pores. Consequently after the instrument has been in use for some time it may become necessary with a standard gas to make the original setting at lower and lower currents. I have found, however, that this difficulty may be overcome by using the circuit shown in Fig. 4. This includes three variable rheostats in the meter circuit. One of these is a step-by-step rheostat R—1 connected by a lead 32 to lead 29 in parallel with meter 23. A second step-by-step rheostat R—2 is connected in series with cell 5 by a lead 33 through a third continuously variable rheostat R—3 the total resistance of which is small relative to the internal resistance of the cell. Rheostats R—1 and R—2 are connected by a coupling switch 34 to meter 23 through a wire lead 35. The resistance values of the rheostats and of meter 23 are so chosen that with a fresh detector cell and with the rheostats R—1 and R—2 in the position a shown in Fig. 4 the meter reading can be set to indicate 21 per cent of oxygen on the scale by adjustment of the rheostat R—3 when air is passed through bore 10a of cathode 10. In this position the lowest resistance step a of rheostat R—1 is in shunt with the meter, thus providing the highest current range. At the same time rheostat R—2 offers the lowest series resistance. As the active area 12 of cathode 10 gradually decreases, the internal resistance of the cell increases, and to maintain the same current with air as the test gas and to set the meter to 21 per cent indication it becomes necessary to move the slide of rheostat R—3 to progressively lower its resistance. Consequently, a condition is finally reached at which the slider reaches the end of its travel so that it becomes impossible to set the meter at 21 per cent oxygen using air.

The resistance range of rheostat R—3 is so chosen that when this condition occurs the calibration curve will have changed due to the contraction of the active cathode area only to a predetermined small amount, e. g., so as to produce an error of only about 5 per cent of the oxygen concentration reading at a point of the scale farthest away from the standardization point. Now in order to be able to adjust the instrument to 21 per cent on air, the operator must turn switch 34 into position b. In this position of the switch, rheostat R—1 introduces a higher resistance in shunt with meter 23 than the one in position a; thus, now when the meter pointer is adjusted to 21 per cent, a smaller current is drawn from the detector cell than with the switch in position a. Since the decrease of the current at 21 per cent O₂ against the original value with the small current loads used in this application is by far to the greatest extent due to shrinkage of the active cathode area, rather than to other causes, the observed decrease in current is a measure of this shrinkage. On this basis, the new value of the shunt to the meter is calculated. It might appear at first sight that the series resistance in rheostat R—2, when changing from switch position a to b, could be left constant or decreased. However, a closer mathematical investigation as well as experiments have shown that (except if the outside resistances were to be made impractically small in comparison with the cell resistance) in order to obtain constant current density the series resistances in R—2 must also be increased, when the shunt resistances R—1 are increased. Formulae to calculate the best resistances in R—2 corresponding to different values of R—1 have been worked out. Their validity has been checked by experiments using a second known oxygen concentration. This experimental method may also be used by those skilled in the art to find without calculation the proper resistance values needed to keep the calibration curve constant. By way of an example, in one instrument that had a substantially constant calibration throughout its life, shunt resistances in R—1 were in positions a—50 ohms, b—100 ohms, c—300 ohms, d—infinity. The corresponding series resistances for constant current density and constant calibrations were: a—200 ohms, b—350 ohms, c—550 ohms, d—750 ohms. The meter used had a resistance of .75 ohms and a scale range of 150 microamperes. Rheostat R—3 had a range of 150 ohms.

The meter scale used with the apparatus provided by the invention can be calibrated readily by the use of a series of gases of known oxygen concentration between the limits for which the apparatus is to be used. For instance, if the instrument is to be used for measuring oxygen deficiency of air atmospheres pure air may be used to fix the upper limit (21% O₂) of the scale, and the meter deflection for lower concentrations can be determined by using a series of gases, such as nitrogen-oxygen mixtures containing less than 21 per cent of oxygen. By restriction of the active area of the cathode to produce a high cathode current density, in accordance with the principles of this invention, there will be obtained a calibration curve exemplified by the following data obtained with one instrument constructed as described above:

| Oxygen, percent | Microammeter deflection |
| --- | --- |
| 21 | 96.0 |
| 18 | 85.7 |
| 15 | 80.5 |
| 12 | 70.5 |
| 9 | 59.5 |
| 6 | 46.0 |
| 3 | 27.0 |

The foregoing calibration data apply to the case where the cathode current density at 21 per cent oxygen is about 35 microamperes per square millimeter.

In the use of the apparatus of this invention the first step is to adjust the cathode current density to that of the reference standard which in the case of oxygen deficiency meters will be that corresponding to 21 per cent of oxygen. That is, the current density will be adjusted to cause a meter deflection against pure air the same as was obtained in calibrating the instrument. To this end the switch 36 is closed and ordinary air is passed through the cathode by means of aspirator bulb 17, which draws air in from the atmosphere and forces it through scrubber 16 whence it passes through side arm 15 and tube 14 into the bore 10a of cathode 10. The effluent air then escapes to the atmosphere through the lateral opening in cap 30. Rheostat R—3 is adjusted until the pointer of meter 23 indicates 21 per cent of oxygen. At this point the cathode current density has been adjusted to the predetermined constant value and the instrument is ready for use with the gas which is to be tested. The latter gas is then passed through the instrument by aspirator bulb 17, and the difference in depolarization due to the difference in oxygen content will affect the flow of current in the circuit and will be indicated by the meter reading.

If the instrument is used for making a series of observations it will ordinarily suffice to check the standard setting only occasionally, sat at intervals of a few hours. On the other hand, if the instrument is used infrequently the current density should be adjusted each time it is used, but this is done easily and quickly merely by passing air through it in the manner described. For ease of checking or adjusting to the standard current density in atmospheres where air is not readily available, a small bottle of standard gas under pressure may be provided which is connected to a conduit 330 which by-passes scrubber 16 and is connected directly to tube 14, as shown in Figs. 1 and 3.

Various modifications are, of course, permissible. For instance, instead of the electrical circuit described above there may be used other means for accomplishing the same result, as by replacing the coupled rheostats R—1 and R—2 by a pair of tandem rheostats of the type used in radio circuits. Or, a radio type rheostat together with a step-by-step rheostat may be used, the former having a dial marked in correspondence with the successive steps of the latter. Other modifications of a circuit for keeping the current density constant will occur to those skilled in the art. Likewise, the tubular cathode might be replaced by a porous cathode mounted in the wall of the cell with its inner surface in contact with the electrolyte and with the gas passed over its outer surface. In the embodiment shown, rheostat R—3 is a radio type slider rheostat which incorporates switch 36 of Fig. 4.

This application is a division of my copending application Serial No. 488,046, filed May 22, 1943, now Patent No. 2,464,087 dated March 8, 1949.

According to the provisions of the patent statutes, I have explained the principle, preferred embodiment and mode of operation of my invention, and have illustrated and described what I now consider to represent its best embodiment. However, I desire to have it understood that, within the scope of the appended claims,

I claim:

1. Apparatus for measuring oxygen deficiency of air atmospheres comprising a container, absorbent material disposed in said container and soaked with a dilute solution of ammonium chloride, a tubular porous carbon electrode acting as a cathode disposed with only its outer surface in contact with said electrolyte, a zinc anode disposed in contact with said electrolyte, said cathode having only a small area of its electrolyte contacting surface relative to the surface of the anode electrically conductive, an electric circuit including the cell formed by said container, electrodes and electrolyte, together with means for measuring current flow in the circuit, and adjustable resistance means for adjusting the current density at the conductive portion of said cathode; and connections to the bore of said cathode for flowing air therethrough out of contact with the electrolyte.

2. Apparatus for measuring the concentration of oxygen in gases comprising a container, a pair of primary cell electrodes disposed in said container, an electrolyte contained in the container in contact with said electrodes and productive of hydrogen polarization at one of said electrodes, the polarizable electrode being permeable by gas but not by electrolyte and having exposed to said electrolyte an electrically conductive surface that is small relative to the electrically conductive area of the other electrode, to thereby provide high current density and concentration of polarizing material thereat, means for passing gas to be tested over a surface of said polarizable electrode that is not in contact with said electrolyte, an electric circuit comprising said electrodes and electrolyte, means for measuring electric current in the circuit, and adjustable resistance means for adjusting the current density at said polarizable electrode to a predetermined constant value and comprising a continuously variable rheostat in series with the cell and measuring means, and a pair of similar coupled step-by-step rheostats one of which is in series with said continuously variable rheostat and the other of which is in shunt with said measuring means, said coupled rheostats being constructed to introduce progressively increasing resistances in series with said variable rheostat and in shunt with said meter.

3. Apparatus for measuring the concentration of oxygen in a gas comprising a container for receiving electrolyte, an anode disposed in the container for contact with the electrolyte, a tubular cathode electronegative to said anode disposed in the container, connections for flowing the gas through the bore of said cathode, said cathode having a portion only of its outer surface exposed to the electrolyte to present an area for current flow that is very small relative to the conductive area of the anode in contact with the electrolyte and which is porous to permit gas to diffuse from the bore to the cathode-electrolyte interface, an electric circuit including said anode and cathode, means for measuring electric current in the circuit, and adjustable resistance means for adjusting the current density at the conductive portion of said cathode to a predetermined constant value.

MOSES G. JACOBSON.

REFERENCES CITED

The following references are of record in the file of this patent:

UNITED STATES PATENTS

| Number | Name | Date |
|---|---|---|
| 1,901,344 | Horton | Mar. 14, 1933 |
| 2,156,693 | Jacobson | May 28, 1939 |
| 2,370,871 | Marks | Mar. 6, 1945 |
| 2,401,287 | Yant et al. | May 28, 1946 |

FOREIGN PATENTS

| Number | Country | Date |
|---|---|---|
| 525,423 | Great Britain | Aug. 28, 1940 |
| 663,080 | Germany | Aug. 3, 1938 |

OTHER REFERENCES

Ser. No. 282,290, Marhenkel (A. P. C.), published May 11, 1943.

"Transactions of the Electrochemical Society," vol. 83 (1943), pages 253 through 260; publication by Berl entitled "A Reversible Oxygen Electrode."

"L'Industrie Chimique," vol. 20, (1922), pages 807, 808.